US009264763B2

(12) United States Patent
Kwon et al.

(10) Patent No.: US 9,264,763 B2
(45) Date of Patent: Feb. 16, 2016

(54) METHOD FOR GENERATING A COMMUNICATION LINK BETWEEN DEVICES, AND APPARATUS FOR SAME

(75) Inventors: Chang-Yeul Kwon, Yongin-si (KR);
Yang-Lim Choi, Seongnam-si (KR);
Il-Ju Na, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 822 days.

(21) Appl. No.: 13/262,355

(22) PCT Filed: Mar. 30, 2010

(86) PCT No.: PCT/KR2010/001925
§ 371 (c)(1),
(2), (4) Date: Sep. 30, 2011

(87) PCT Pub. No.: WO2010/114277
PCT Pub. Date: Oct. 7, 2010

(65) Prior Publication Data
US 2012/0023240 A1   Jan. 26, 2012

Related U.S. Application Data

(60) Provisional application No. 61/165,017, filed on Mar. 31, 2009, provisional application No. 61/167,926, filed on Apr. 9, 2009.

(30) Foreign Application Priority Data

Mar. 29, 2010   (KR) .................. 10-2010-0028091

(51) Int. Cl.
*G06F 15/16* (2006.01)
*H04N 21/4367* (2011.01)

(52) U.S. Cl.
CPC .................. *H04N 21/4367* (2013.01)

(58) Field of Classification Search
USPC ........................................... 709/228
See application file for complete search history.

(56) References Cited

U.S. PATENT DOCUMENTS 6,170,008 B1 * 1/2001 Bahlmann et al. ............ 709/230
6,760,772 B2 * 7/2004 Zou et al. ...................... 709/230
(Continued)

FOREIGN PATENT DOCUMENTS

KR   10-2004-0072815 A   8/2004
KR   10-2004-0098080 A   11/2004

OTHER PUBLICATIONS

International Search Report (PCT/ISA/210) dated Nov. 19, 2010, in International Applicaton No. PCT/KR2010/001925.
(Continued)

*Primary Examiner* — Alicia Baturay
(74) *Attorney, Agent, or Firm* — Sughrue Mion, PLLC

(57) ABSTRACT

A method and apparatus for establishing a communication link between a first device and a second device are provided. The method includes transmitting, to the second device, a connection request frame requesting to set a communication link; and receiving, from the second device, the connection request frame including first encoding selection information selecting an encoding method to be applied to content to be transmitted between the first and second devices from among a digital transmission content protection (DTCP) technology and a high-bandwidth digital content protection (HDCP) technology, a connection response frame approving a request to set the communication link by the connection request frame, the connection response frame including second encoding selection information selecting an encoding method identical to the encoding method selected by the connection request frame.

21 Claims, 7 Drawing Sheets

(56) References Cited

U.S. PATENT DOCUMENTS

| | | | |
|---|---|---|---|
| 8,527,771 B2* | 9/2013 | Candelore | H04N 21/43632 713/175 |
| 8,705,579 B2* | 4/2014 | Anderson | H04L 1/0061 370/389 |
| 2004/0162785 A1 | 8/2004 | Stone | |
| 2004/0205812 A1* | 10/2004 | Candelore | H04N 5/913 725/31 |
| 2009/0031387 A1 | 1/2009 | Boyden et al. | |

OTHER PUBLICATIONS

Written Opinion (PCT/ISA/237) dated Nov. 19, 2010, in International Applicaton No. PCT/KR2010/001925.

* cited by examiner

METHOD FOR GENERATING A COMMUNICATION LINK BETWEEN DEVICES, AND APPARATUS FOR SAME

CROSS-REFERENCE TO RELATED APPLICATION

This application claims the benefit of U.S. Provisional Application No. 61/165,017 filed on Mar. 31, 2009, and U.S. Provisional Application No. 61/167,926 filed on Apr. 9, 2009, and claims priority from Korean Patent Application No. 10-2010-0028091, filed on Mar. 29, 2010 in the Korean Intellectual Property Office, the disclosures of each of which are incorporated by reference herein in their entirety.

BACKGROUND

1. Field

Methods and apparatuses consistent with the present disclosure relate to establishing a communication link between devices.

2. Description of the Related Art

The necessity for technologies capable of protecting digital content has been on the rise since digital content can be simply copied or processed without deterioration of sound quality and resolution.

Examples of these technologies include a digital transmission content protection (DTCP) technology and a high-bandwidth digital content protection (HDCP) technology.

Here, the DTCP technology is for preventing digital content that is transmitted through an Institute of Electrical and Electronics Engineers (IEEE) 1394 interface or a universal serial bus (USB) interface from being copied. Only a device supporting the DTCP technology can decode encoded content according to the DTCP technology.

Also, the HDCP technology is for preventing digital content transmitted through a high bandwidth interface, such as a digital visual interface (DVI) or a high definition multimedia interface (HDMI), from being copied. Only a device supporting the HDCP technology can decode encoded content or reproduce the encoded content in high resolution according to the HDCP technology.

SUMMARY

Exemplary embodiments provide a method and apparatus for establishing a communication link between devices.

According to an aspect of an exemplary embodiment, there is provided a method of establishing a communication link between a first device and a second device, the method including transmitting, to the second device, a connection request frame requesting to set a communication link, the connection request frame including first encoding selection information selecting an encoding method to be applied to content to be transmitted between the first and second devices from among a digital transmission content protection (DTCP) technology and a high-bandwidth digital content protection (HDCP) technology; and receiving, from the second device, a connection response frame approving a request to set the communication link by the connection request frame, the connection response frame including second encoding selection information that selects an encoding method identical to the encoding method selected by the connection request frame.

The method may further include receiving, from the second device, a capability request frame for requesting information about a capability supported by the first device; and transmitting, to the second device, a capability response frame including the information about the capability supported by the first device, in response to the capability request frame.

The information about the capability supported by the first device may include supported encoding information indicating an encoding method supported by the first device from among the DTCP and HDCP technologies.

The method may further include transmitting, to the second device, a channel time allocation request frame for requesting allocation of a channel time for content transmission; and receiving, from the second device, a channel time allocation response frame for approving the request to allocate the channel time by the channel time allocation request frame.

The channel time allocation request frame may include third encoding selection information that selects an encoding method identical to the encoding method selected by the connection request frame as an encoding method to be applied to content transmitted during the requested channel time, and the channel time allocation response frame may include fourth encoding selection information that selects an encoding method identical to the encoding method selected by the channel time allocation request frame.

The method may further include receiving, from the second device, a transmission start notification frame for notifying that a content transmission is started according to a channel time allocated by the channel time allocation response frame.

The transmission start notification frame may include fifth encoding selection information for selecting an encoding method identical to the encoding method selected by the channel time allocation response frame.

Each of the first and second encoding selection information may include both DTCP selection information and HDCP selection information, the DTCP selection information indicating whether the content transmitted between the first and second devices is to be protected by using the DTCP technology, and the HDCP selection information indicating whether the content is to be protected by using the HDCP technology.

When content protected according to the encoding method selected by the connection request frame is started to be transmitted between the first and second devices, the encoding method may remain the same until the content is completely transmitted.

According to an aspect of another exemplary embodiment, there is provided an apparatus for establishing a communication link between the apparatus and an external device, the apparatus including a transmitter that transmits, to the external device, a connection request frame requesting to set a communication link, the connection request frame including first encoding selection information that selects an encoding method to be applied to content to be transmitted between the apparatus and the external device from among a DTCP technology and an HDCP technology; and a receiver that receives, from the external device, a connection response frame approving a request to set the communication link by the connection request frame, the connection response frame including second encoding selection information that selects an encoding method identical to the encoding method selected by the connection request frame.

According to an aspect of another exemplary embodiment, there is provided a computer readable recording medium having recorded thereon a program for executing a method of establishing a communication link between a first device and a second device, the method including transmitting, to the second device, a connection request frame requesting to set a communication link, the connection request frame including first encoding selection information selecting an encoding method to be applied to content to be transmitted between the first and second devices from among a DTCP technology and an HDCP technology; and receiving, from the second device, a connection response frame approving a request to set the communication link by the connection request frame, the connection response frame including second encoding selection information that selects an encoding method identical to the encoding method selected by the connection request frame.

BRIEF DESCRIPTION OF THE DRAWINGS

The above and other aspects will become more apparent by describing in detail exemplary embodiments with reference to the attached drawings in which.

DETAILED DESCRIPTION

Hereinafter, exemplary embodiments will be described more fully with reference to the accompanying drawings, in which exemplary embodiments are shown.

Figure 1:
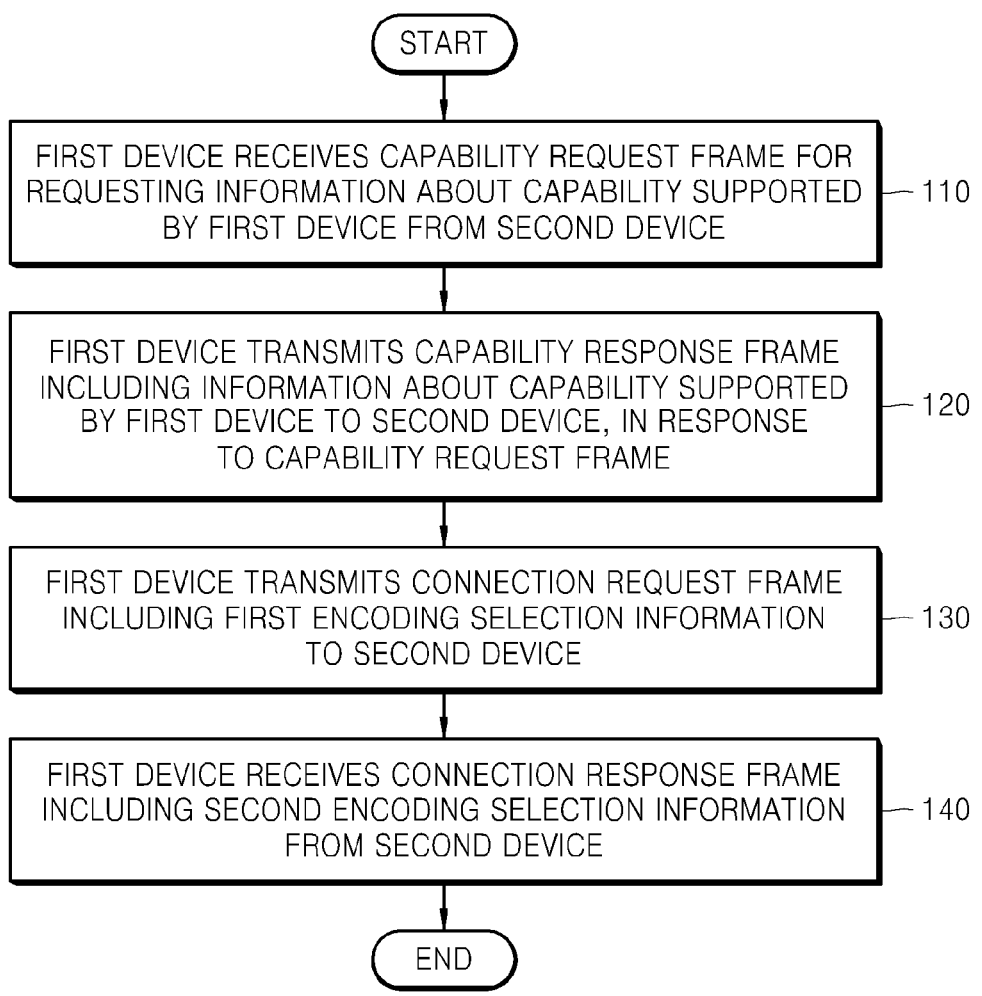
FIG. 1 is a flowchart illustrating an example of a method of establishing a communication link between devices, according to an exemplary embodiment.

FIG. 1 is a flowchart illustrating an example of a method of establishing a communication link between devices, according to an exemplary embodiment.

In operation 110, a first device receives, from a second device, a capability request frame for requesting information about a capability supported by the first device from the second device.

Here, the capability request frame may request information about overall capabilities supported by the first device, or certain information desired by the second device.

For example, the capability request frame may include a request for a name of the first device, a media access control (MAC) address of the first device, and whether the first device supports a digital transmission content protection (DTCP) technology or a high-bandwidth digital content protection (HDCP) technology.

In the current exemplary embodiment, the first device may be a sink device and the second device may be a source device.

In operation 120, the first device transmits a capability response frame including the information about the capability supported by the first device to the second device, in response to the capability request frame.

Here, the capability response frame may include supported encoding information indicating an encoding method supported by the first device, from among the DTCP technology and the HDCP technology. Here, the supported encoding information indicates whether the first device supports only the DTCP technology, only the HDCP technology, or both DTCP and HDCP technologies.

The capability response frame may include a DTCP support field indicating whether the first device supports the DTCP technology, and an HDCP support field indicating whether the first device supports the HDCP technology.

As such, when the capability response frame includes the DTCP support field and the HDCP support field, the encoding method supported by the first device may be determined from among the DTCP and HDCP technologies based on whether 0 or 1 is set in the DTCP and HDCP support fields.

For example, when the DTCP support field is set to 0, the first device does not support the DTCP technology, and when the DTCP support field is set to 1, the first device supports the DTCP technology. Also, when the HDCP support field is set to 0, the first device does not support the HDCP technology, and when the HDCP support field is set to 1, the first device supports the HDCP technology. However, a value set in the DTCP and HDCP support fields is not limited to 0 and 1. Also, the HDCP technology according to the present exemplary embodiment may be an encoding method according to an HDCP 2.0 standard.

The capability response frame may further include the name of the first device, the MAC address of the first device, etc., in addition to the supported encoding information.

Alternatively, operations 110 and 120 may be omitted. For example, if the second device already knows the capabilities of the first device, the capability request frame and the capability response frame need not be transmitted between the first and second devices.

In operation 130, the first device transmits, to the second device, a connection request frame that includes first encoding selection information for selecting an encoding method to be applied to content to be transmitted between the first and second devices from among the DTCP and HDCP technologies, and requests the second device to set a communication link.

Here, it is determined which encoding method the first device is requesting the second device to use while setting a communication link, according to the encoding method selected by the first encoding selection information.

In other words, when the first encoding selection information is about selecting the DTCP technology as the encoding method to be applied to the content, the first device requests the second device to establish the communication link based on the DTCP technology. Alternatively, when the first encoding selection information is about selecting the HDCP technology as the encoding method to be applied to the content, the first device requests the second device to establish the communication link based on the HDCP technology via the connection request frame.

Alternatively, the first encoding selection information may include DTCP selection information indicating whether the content is to be protected by using the DTCP technology and HDCP selection information indicating whether the content is to be protected by using the HDCP technology.

For example, when a value of the DTCP selection information is 1 and a value of the HDCP information is 0, the content is protected by the DTCP technology, and when a value of the DTCP information is 0 and a value of the HDCP information is 1, the content is protected by using the HDCP technology. Here, both the values of the DTCP selection information and HDCP information cannot be set to 1, because although it is possible to encode the content by using one of the DTCP and HDCP technologies, it is not possible to encode the content by using both the DTCP and HDCP technologies. However, the values of the DTCP and HDCP selection information are not limited thereto.

A structure of the connection request frame will be described later with reference to FIG. 3.

In operation 140, the first device receives, from the second device, a connection response frame including second encoding selection information for selecting the same encoding method as the encoding method selected by the connection request frame, and approving the request to set a communication link by using the connection request frame.

Here, the connection response frame includes the second encoding selection information so as to approve the request to set the communication link based on the encoding method selected by the connection request frame.

Alternatively, the second encoding selection information may include the DTCP selection information indicating whether the content is protected by using the DTCP technology, and the HDCP selection information indicating whether the content is protected by using the HDCP technology. Here, the second encoding selection information may have the same structure as the first encoding selection information including the DTCP selection information and the HDCP selection information.

A structure of the connection request frame will be described in detail later with reference to FIG. 4.

As such, when the first device receives the connection response frame from the second device, the communication link is established between the first and second devices based on the encoding method selected by the connection response frame.

Related art devices supporting the HDCP technology can only establish a communication link based on the HDCP technology, and related art devices supporting the DTCP technology can only establish a communication link based on the DTCP technology. However, in the method according to an exemplary embodiment, the first device is able to establish a communication link based on a desired encoding method from among the DTCP technology and the HDCP technology, by using the first encoding selection information and the second encoding selection information respectively included in the connection request frame and the connection response frame.

However, in order to select one of the DTCP and HDCP technologies, the first and second devices must be able to support both the DTCP and HDCP technologies, but there is no related art device that supports both the DTCP and HDCP technologies.

Figure 2:
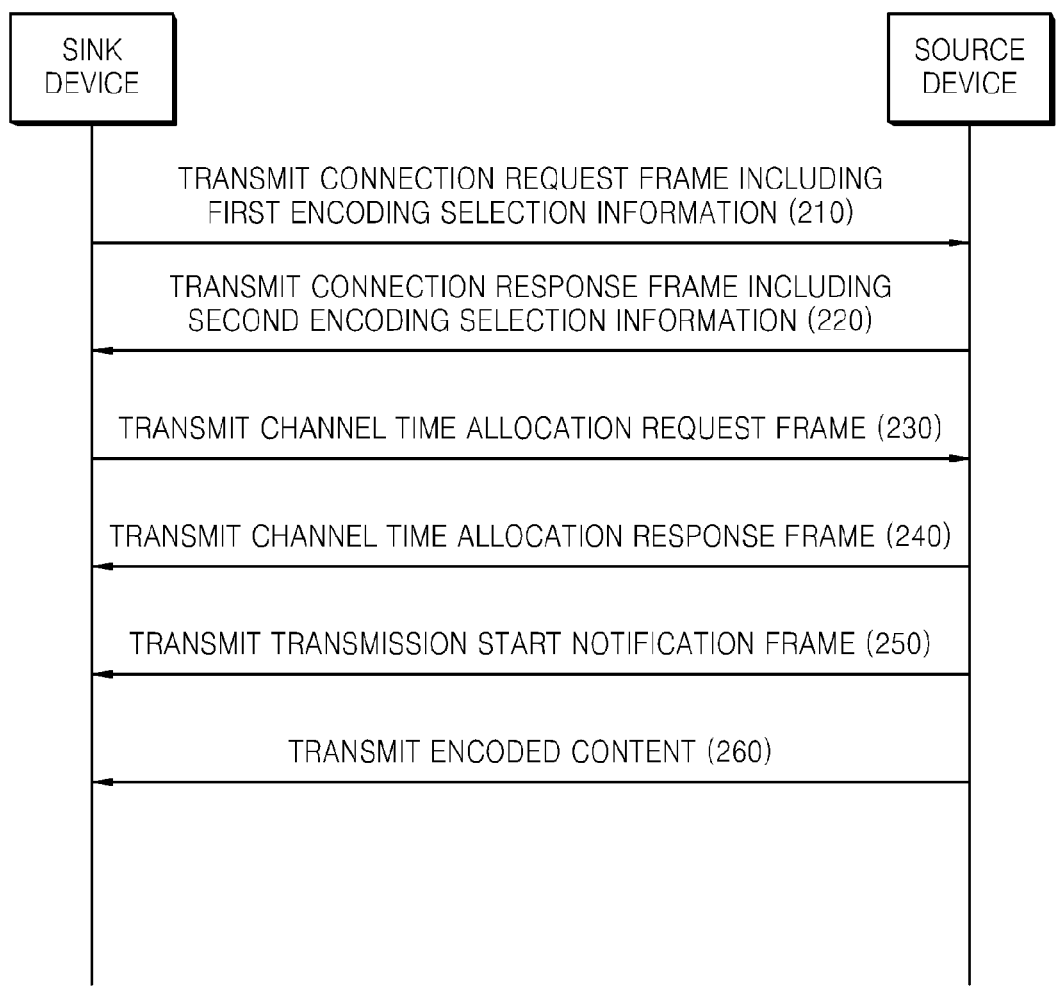
FIG. 2 is a flowchart illustrating an example of a method of transmitting encoded content by applying a method of establishing a communication link, according to an exemplary embodiment.

FIG. 2 is a flowchart illustrating a method of transmitting encoded content by applying a method of establishing a communication link, according to an exemplary embodiment.

In operation 210, a sink device transmits a connection request frame including first encoding selection information to a source device.

Alternatively, the source device may transmit the connection request frame to the sink device.

In operation 220, the source device transmits a connection response frame including second encoding selection information to the sink device.

If the source device transmits the connection request frame to the sink device in operation 210, the sink device transmits the connection response frame to the source device in operation 220.

In operation 230, the sink device transmits, to the source device, a channel time allocation request frame requesting allocation of a channel time for content transmission.

Here, the channel time allocation request frame may include third encoding selection information for selecting the same encoding method selected by the connection request frame as an encoding method to be applied to content transmitted during the requested channel time.

A structure of the channel time allocation request frame will be described in detail later with reference to FIG. 5.

In operation 240, the source device transmits to the sink device a channel time allocation response frame for approving a request to allocate a channel time to the sink device, in response to the channel time allocation request frame.

If the channel time allocation request frame includes the third encoding selection information in operation 230, the channel time allocation response frame may include fourth encoding selection information for selecting the same encoding method selected by the third encoding selection information of the channel time allocation request frame.

In operation 250, the source device transmits, to the sink device, a transmission start notification frame for notifying that the content is starting to be transmitted according to the channel time allocated by the channel time allocation response frame.

Here, the transmission start notification frame may include fifth encoding selection information for selecting the same encoding method selected by the channel time allocation response frame.

A structure of the transmission start notification frame will be described in detail later with reference to FIG. 6.

In operation 260, the source device encodes the content according to the encoding method selected by the connection request frame from among the DTCP and HDCP technologies, and transmits the encoded content to the sink device.

Here, the encoded content may be transmitted by using a downloading or streaming transmission method.

Alternatively, when the source device starts to transmit content to the sink device, an encoding method applied to the content may not change until the content is completely transmitted. However, when the source device tries to transmit new content to the sink device, a new encoding method may be applied to the new content.

If the source device streams streaming content to the sink device, an encoding method applied to the streaming content may not change until an identifier of the streaming content is changed. Here, the identifier of the streaming content is changed when the streaming content streamed from the source device to the sink device is changed to a new streaming content.

Alternatively, when the source device completely transmits the content to the sink device, the source device may transmit a connection release frame for releasing the communication link to the sink device.

Figure 3:
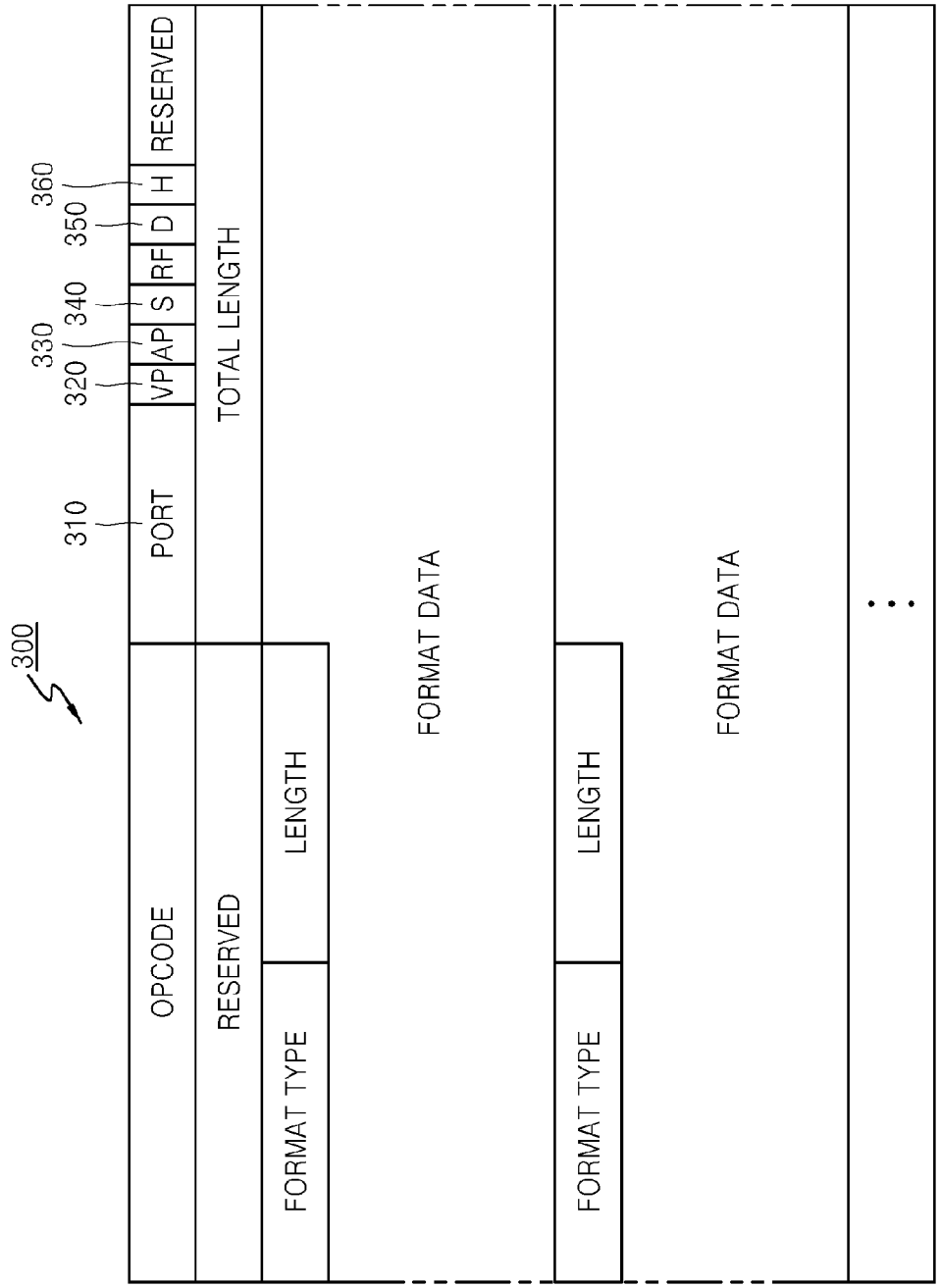
FIG. 3 is a diagram for describing a structure of a connection request frame, according to an exemplary embodiment.

FIG. 3 is a diagram for describing a structure of a connection request frame 300, according to an exemplary embodiment.

Referring to FIG. 3, the connection request frame 300 includes a port field 310, a VP field 320, an AP field 330, an S field 340, a D field 350, and an H field 360.

The port field 310 denotes information about a port of the sink device or source device used for a communication link between the source and sink devices.

The VP field 320 denotes whether the port in the port field 310 is used for video content.

The AP field 330 denotes whether the port of the port field 310 is used for audio content.

The S field 340 denotes whether the port of the port field 310 is the port of the sink device or the port of the source device. If the sink device transmitted the connection request frame, the port of the port field 310 is the port of the sink device, and if the source device transmitted the connection request frame, the port of the port field 310 is the port of the source device.

The D field 350 denotes whether the content is protected by using the DTCP technology. The D field 350 corresponds to the DTCP selection information described above.

The H field 360 denotes whether the content is protected by using the HDCP technology. The H field 350 corresponds to the HDCP selection information described above.

Descriptions about other fields of the connection request frame 300 of FIG. 3 are described in WirelessHD specification, revision 1.08D2, and thus details thereof will be omitted herein.

Figure 4:
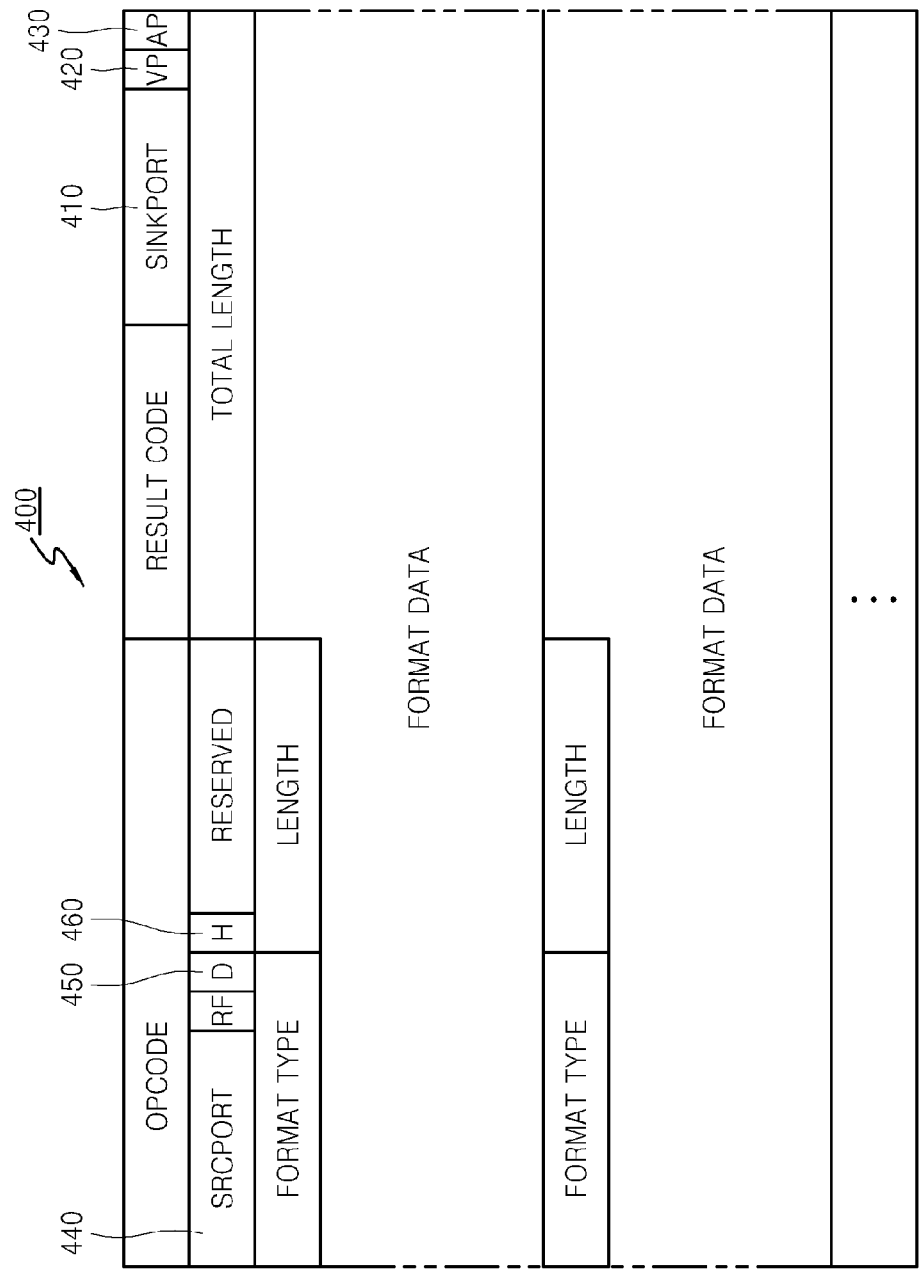
FIG. 4 is a diagram for describing a structure of a connection response frame, according to an exemplary embodiment.

FIG. 4 is a diagram for describing a structure of a connection response frame 400, according to an exemplary embodiment.

Referring to FIG. 4, the connection response frame 400 includes a sink port field 410, a VP field 420, an AP field 430, a source port field 440, a D field 450, and an H field 460.

The sink port field 410 denotes a port number of a sink device to be used for content transmission.

The VP field 420 denotes whether a port of the sink device or source device is used for video content.

The AP field 430 denotes whether the port of the sink device or source device is used for audio content.

The source port field 440 denotes a port number of the source device used for content transmission.

The D field 450 denotes whether content is protected by using a DTCP technology. The D field 450 corresponds to the DTCP selection information described above.

The H field 460 denotes whether content is protected by using an HDCP technology. The H field 460 corresponds to the HDCP selection information described above.

Meanwhile, descriptions about other fields of the connection response frame 400 of FIG. 4 are described in WirelessHD specification, revision 1.08D2, and thus details thereof will be omitted herein.

Figure 5:
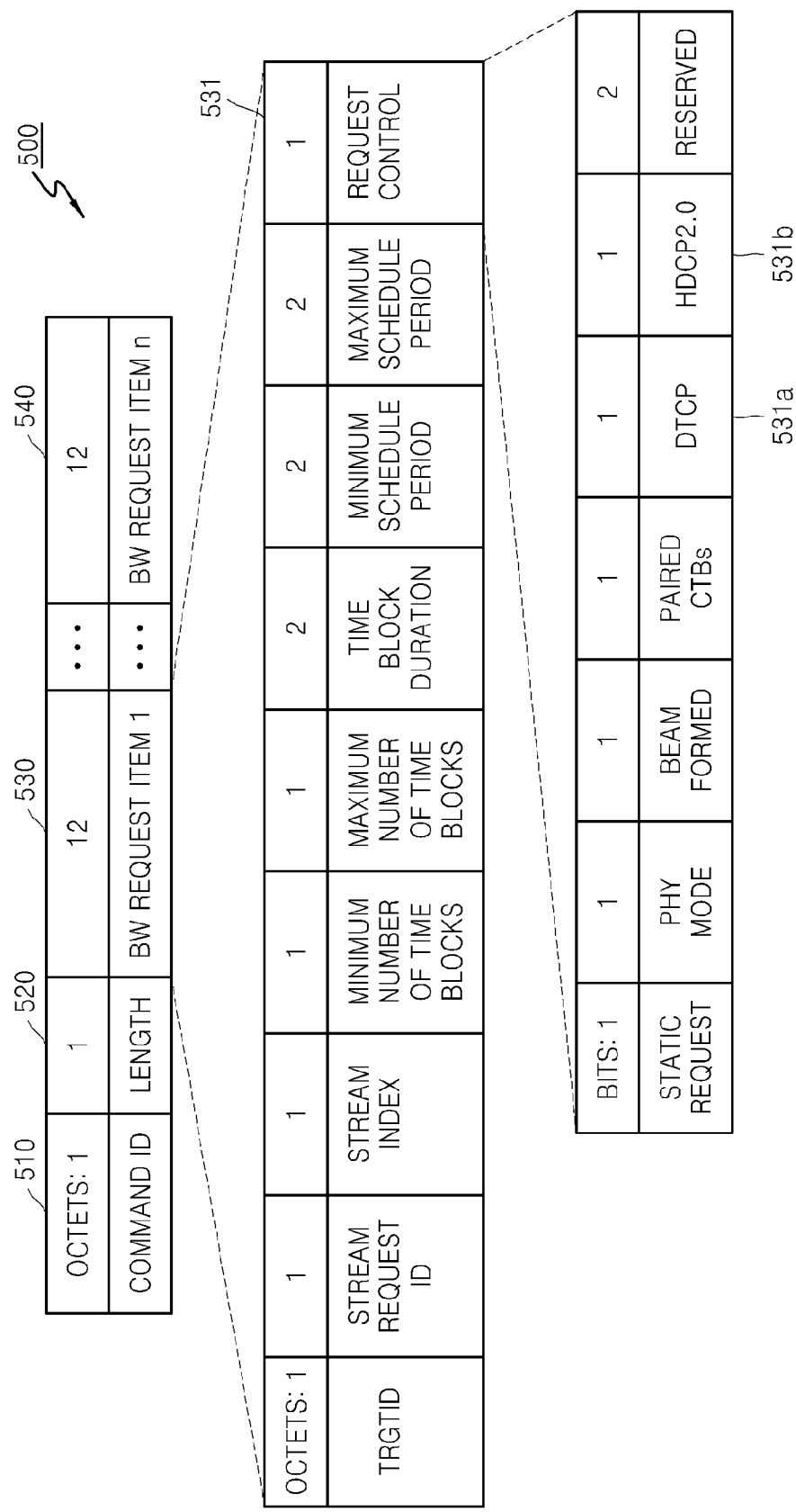
FIG. 5 is a diagram for describing a structure of a channel time allocation request frame, according to an exemplary embodiment.

FIG. 5 is a diagram for describing a structure of a channel time allocation request frame 500, according to an exemplary embodiment.

Referring to FIG. 5, the channel time allocation request frame 500 includes a command ID field 510, a length field 520, and BW request item 1 530 to BW request item n 540. That is, the BW request items are provided in a number n.

The command ID field 510 denotes that the channel time allocation request frame is a frame for requesting allocation of a channel time.

The length field 520 denotes a length of the channel time allocation request frame 500.

Each of the BW request item fields are the same, and thus BW request item 530 will be described as an example. The BW request item fields are fields for requesting allocation of a channel time, and allocation of a plurality of channel times may be requested through the BW request item fields.

Referring to FIG. 5, the BW request item field 530 includes a request control field 531.

The request control field 531 is a field including control information related to a request to allocate a channel time.

The request control field 531 includes a DTCP field 531a and an HDCP 2.0 field 531b.

The DTCP field 531a indicates whether content is to be protected by using a DTCP technology.

The HDCP 2.0 field 531b indicates whether content is to be protected by using an HDCP 2.0 technology.

Meanwhile, since descriptions about the remaining fields of the channel time allocation request frame 500 of FIG. 5 are provided in WirelessHD specification, revision 1.08D2, the details thereof will be omitted.

Figure 6:
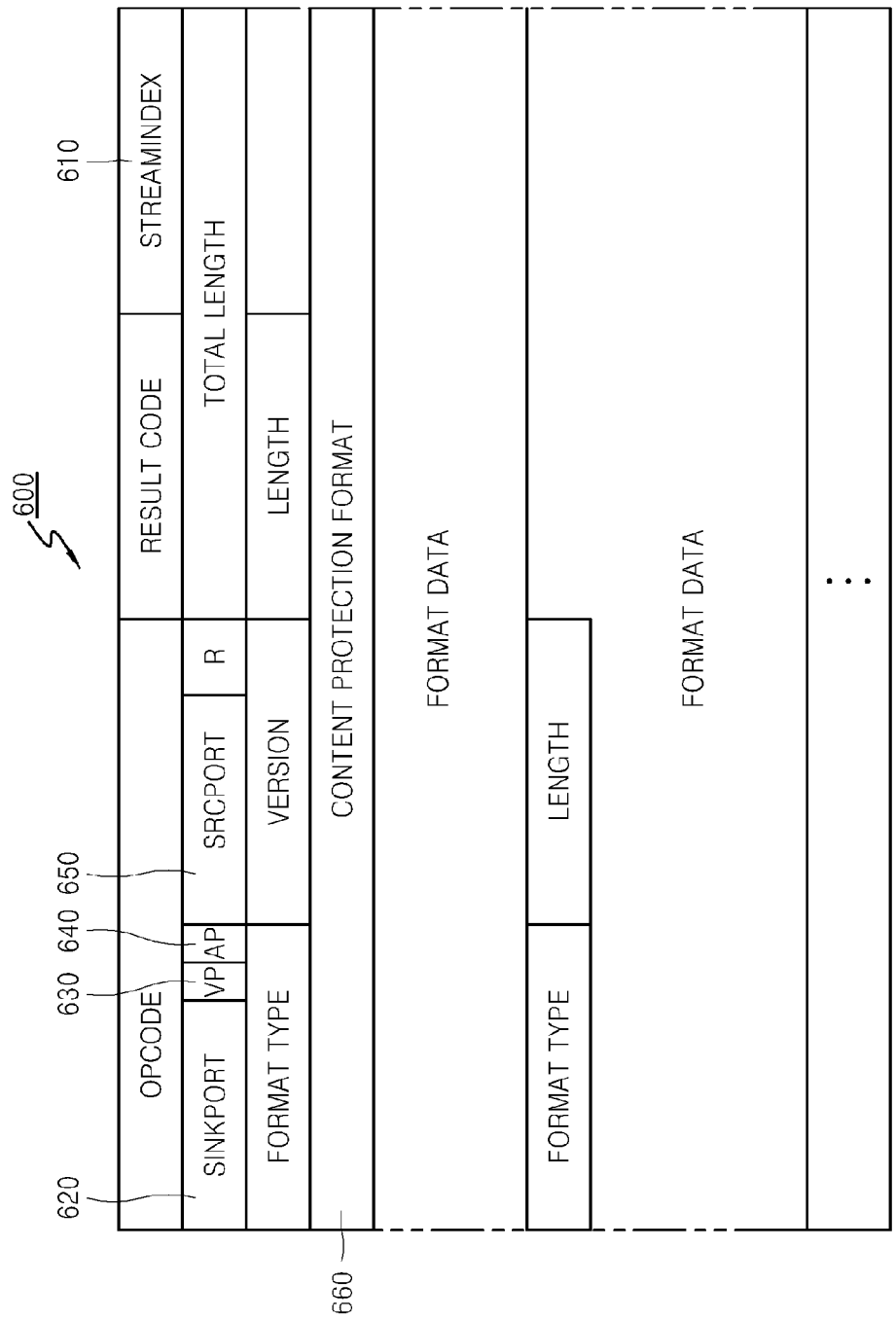
FIG. 6 is a diagram for describing a structure of a transmission start notification frame, according to an exemplary embodiment.

FIG. 6 is a diagram for describing a structure of a transmission start notification frame 600, according to an exemplary embodiment.

Referring to FIG. 6, the transmission start notification frame 600 includes a stream index field 610, a sink port field 620, a VP field 630, an AP field 640, a source port field 650, and a content protection format field 660.

The stream index field 610 denotes an index of content to be transmitted from a source device to a sink device. Here, the content may be transmitted in a streaming transmission method.

The sink port field 620 denotes a port number of the sink device to be used to transmit the content.

The VP field 630 denotes whether a port of the sink device or a port of the source device is used for video content.

The AP field 640 denotes whether the port of the sink device or the port of the source device is used for audio content.

The source port field 650 denotes a port number of the source device to be used to transmit the content.

The content protection format field 660 is a field for selecting the same encoding method selected by a channel time allocation response frame from among a DTCP technology and an HDCP technology. In other words, the content protection format field 660 indicates whether the content is to be protected by using the DTCP technology or the HDCP technology. The content protection format field 660 corresponds to the fifth encoding selection information described above.

Meanwhile, since descriptions about remaining fields of the transmission start notification frame 600 of FIG. 6 are in WirelessHD specification, revision 1.08D2, details thereof will be omitted.

Figure 7:
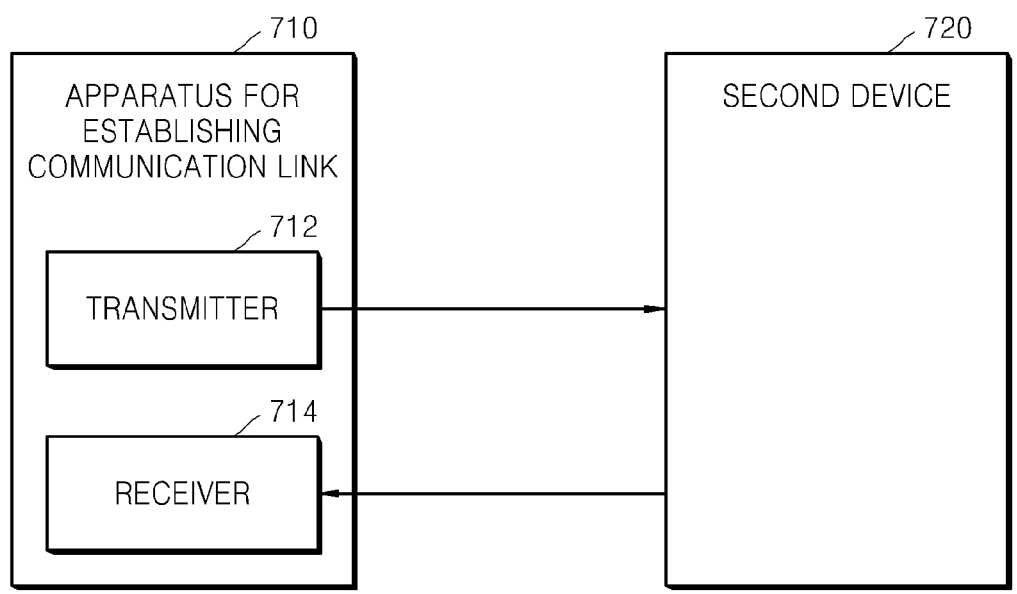
FIG. 7 is a block diagram of an apparatus for establishing a communication link, according to an exemplary embodiment.

FIG. 7 is a block diagram of an apparatus 710 for establishing a communication link, according to an exemplary embodiment. Here, the apparatus 710 is assumed to be installed in a first device. Also, a second device 720, also referred to as an external device, is further illustrated for convenience of description.

Referring to FIG. 7, the apparatus 710 includes a transmitter 712 and a receiver 714. The transmitter 712 and the receiver 714 may be implemented in conjunction with one or more central processing units (CPUs), and the capability request frame, the capability response frame, the connection request frame, and the connection response frame may be generated by one or more central processing units (CPUs) alone or in conjunction with one or more memories.

The transmitter 712 transmits a connection request frame including first encoding selection information to the second device 720.

The receiver 714 receives a connection response frame including second encoding selection information from the second device 720.

The transmitter 712 may further transmit a capability response frame, a channel time allocation request frame, or the like, and the receiver 712 may further receive a capability request frame, a channel time allocation response frame, a transmission start notification frame, content, or the like.

The exemplary embodiments may be provided as computer programs and may be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While exemplary embodiments have been particularly shown and described, it will be understood by those of ordinary skill in the art that various changes in form and details may be made therein without departing from the spirit and scope of the present inventive concept as defined by the appended claims. The exemplary embodiments should be considered in a descriptive sense only and not for purposes of limitation. Therefore, the scope of the present inventive concept is defined not by the detailed description of the invention but by the appended claims, and all differences within the scope will be construed as being included in the present invention.

The invention claimed is:

1. A method of establishing a communication link between a first device and a second device, the method comprising:
   transmitting, to the second device, a connection request frame requesting to set a communication link, the connection request frame comprising first encoding selection information selecting an encoding method to be applied to content to be transmitted between the first and second devices from among a digital transmission content protection (DTCP) technology and a high-bandwidth digital content protection (HDCP) technology; and
   receiving, from the second device, a connection response frame approving a request to set the communication link by the connection request frame, the connection response frame comprising second encoding selection information selecting an encoding method identical to the encoding method selected by the connection request frame,
   wherein the connection request frame comprises:
   a first data field indicating that the DTCP technology is to be applied to the content transmitted between the first and second devices; and
   a second data field indicating that the HDCP technology is to be applied to the content transmitted between the first and second devices.

2. The method of claim 1, further comprising:
   receiving, from the second device, a capability request frame requesting information about a capability supported by the first device; and
   transmitting, to the second device, a capability response frame comprising the information about the capability supported by the first device, in response to the capability request frame.

3. The method of claim 2, wherein the information about the capability supported by the first device comprises supported encoding information indicating an encoding method supported by the first device from among the DTCP and HDCP technologies.

4. The method of claim 1, further comprising:
   transmitting, to the second device, a channel time allocation request frame requesting allocation of a channel time for content transmission; and
   receiving, from the second device, a channel time allocation response frame approving the request to allocate the channel time by the channel time allocation request frame.

5. The method of claim 4, wherein the channel time allocation request frame comprises third encoding selection information selecting an encoding method identical to the encoding method selected by the connection request frame as an encoding method to be applied to content transmitted during the requested channel time, and
   the channel time allocation response frame comprises fourth encoding selection information selecting an encoding method identical to the encoding method selected by the channel time allocation request frame.

6. The method of claim 4, further comprising receiving, from the second device, a transmission start notification frame notifying that a content transmission is started according to a channel time allocated by the channel time allocation response frame.

7. The method of claim 6, wherein the transmission start notification frame comprises fifth encoding selection information selecting an encoding method identical to the encoding method selected by the channel time allocation response frame.

8. The method of claim 1, wherein each of the first and second encoding selection information comprises both DTCP selection information and HDCP selection information, the DTCP selection information indicating whether the content transmitted between the first and second devices is to be protected by using the DTCP technology, and the HDCP selection information indicating whether the content is to be protected by using the HDCP technology.

9. The method of claim 1, wherein, when content protected according to the encoding method selected by the connection request frame is started to be transmitted between the first and second devices, the encoding method does not change until the content is completely transmitted.

10. A non-transitory computer readable recording medium having recorded thereon a program for executing the method of claim 1.

11. The method of claim 1, wherein at least one of the first device and the second device supports the DTCP technology and the HDCP technology.

12. An apparatus for establishing a communication link to an external device, the apparatus comprising:
    a transmitter that transmits, to the external device, a connection request frame requesting to set a communication link, the connection request frame comprising first encoding selection information selecting an encoding method to be applied to content to be transmitted between the apparatus and the external device from among a digital transmission content protection (DTCP) technology and a high-bandwidth digital content protection (HDCP) technology; and
    a receiver that receives, from the external device, a connection response frame approving a request to set the communication link by the connection request frame, the connection response frame comprising second encoding selection information selecting an encoding method identical to the encoding method selected by the connection request frame,
    wherein the connection request frame comprises:
    a first data field indicating that the DTCP technology is to be applied to the content transmitted between the first and second devices; and
    a second data field indicating that the HDCP technology is to be applied to the content transmitted between the first and second devices.

13. The apparatus of claim 12, wherein the receiver further receives, from the external device, a capability request frame requesting information about a capability supported by the apparatus, and
    the transmitter further transmits, to the external device, a capability response frame comprising the information about the capability supported by the apparatus, in response to the capability request frame.

14. The apparatus of claim 13, wherein the information about the capability supported by the apparatus comprises supported encoding information indicating an encoding method supported by the apparatus from among the DTCP and HDCP technologies.

15. The apparatus of claim 12, wherein the transmitter further transmits, to the external device, a channel time allocation request frame requesting allocation of a channel time for content transmission, and the receiver further receives, from the external device, a channel time allocation response frame approving a request to allocate the channel time by the channel time allocation request frame.

16. The apparatus of claim 15, wherein the channel time allocation request frame comprises third encoding selection information selecting an encoding method identical to the encoding method selected by the connection request frame as an encoding method to be applied to content transmitted during the requested channel time, and the channel time allocation response frame comprises fourth encoding selection information selecting an encoding method identical to the encoding method selected by the channel time allocation request frame.

17. The apparatus of claim 15, wherein the receiver further receives, from the external device, a transmission start notification frame notifying that a content transmission is started according to a channel time allocated by the channel time allocation response frame.

18. The apparatus of claim 17, wherein the transmission start notification frame comprises fifth encoding selection information selecting an encoding method identical to the encoding method selected by the channel time allocation response frame.

19. The apparatus of claim 12, wherein each of the first and second encoding selection information comprises both DTCP selection information and HDCP selection information, the DTCP selection information indicating whether the content transmitted between the apparatus and the external device is to be protected by using the DTCP technology, and the HDCP selection information indicating whether the content is to be protected by using the HDCP technology.

20. The apparatus of claim 12, wherein, when content protected according to the encoding method selected by the connection request frame is started to be transmitted between the apparatus and the external device, the encoding method does not change until the content is completely transmitted.

21. An apparatus for establishing a communication link to an external device, the apparatus comprising:

a transmitter that transmits, to the external device, a connection request frame that comprises both a digital transmission content protection (DTCP) flag and a high-bandwidth digital content protection (HDCP) flag, the DTCP flag indicating whether the apparatus can perform DTCP encoding and the HDCP flag indicating whether the apparatus can perform HDCP encoding, the connection request frame requesting to set a communication link with the external device; and a receiver that receives, from the external device, a connection response frame that comprises a DTCP flag and a HDCP flag, the DTCP flag and the HDCP flag set identically to the DTCP flag and the HDCP flag of the connection request frame, the connection response frame approving the request to set the communication link by the connection request frame, wherein the apparatus encodes, using at least one central processing unit, content using an encoding method selected based on the DTCP flag and the HDCP flag, and the transmitter transmits the encoded content to the external device; and wherein the DTCP flag or the HDCP flag may be set to select either DTCP encoding or HDCP encoding, but not both, wherein the connection request frame comprises:

a first data field indicating that the DTCP technology is to be applied to the content transmitted between the first and second devices; and a second data field indicating that the HDCP technology is to be applied to the content transmitted between the first and second devices.

\* \* \* \* \*